United States Patent [19]
Yie et al.

[11] 3,888,652
[45] June 10, 1975

[54] IRRIGATION ENGINE EXHAUST CONVERSION TO OBTAIN FERTILIZING SOLUTION

[75] Inventors: Gene G. Yie, Chicago, Ill.; S. J. Cummingham, Palos Verdes, Calif.; Robert E. Rosenberg, Hinsdale, Ill.

[73] Assignees: Institute of Gas Technology, Chicago, Ill.; Southern California Gas Company, Los Angeles, Calif. ; part interest to each

[22] Filed: May 29, 1973

[21] Appl. No.: 364,656

[52] U.S. Cl. .......................... 71/61; 71/54; 71/64 C; 71/64 SC
[51] Int. Cl. ............................................. A01c 23/04
[58] Field of Search ........ 71/1, 54, 61, 64 SC, 64 A

[56] References Cited
UNITED STATES PATENTS

| | | | |
|---|---|---|---|
| 1,083,703 | 1/1914 | Rothe | 423/352 |
| 2,020,824 | 11/1935 | DeBruyn | 71/1 |
| 2,088,869 | 8/1937 | Porter | 71/1 |
| 2,152,473 | 3/1939 | Griffith et al. | 423/352 |
| 2,936,548 | 5/1960 | Morrison | 71/1 X |
| 2,943,419 | 7/1960 | Harris | 71/28 X |
| 3,337,989 | 8/1967 | Herman | 71/1 X |
| 3,810,361 | 5/1974 | Weaving et al. | 23/288 FB |

*Primary Examiner*—Charles N. Hart
*Assistant Examiner*—Ferris H. Lander
*Attorney, Agent, or Firm*—Dominik, Knechtel, Godula & Demeur

[57] ABSTRACT

A method and apparatus for fertilizing crop areas by dispensing aqueous ammonia solutions from irrigation engines by utilizing the body of water which moves through the engine-driven pumps. The ammonia is formed in place by catalytically converting nitrogen oxide emissions present in the engine exhaust. The ammonia is thereafter dissolved in the body of water which moves through the irrigation pump driven by the engine.

8 Claims, 1 Drawing Figure

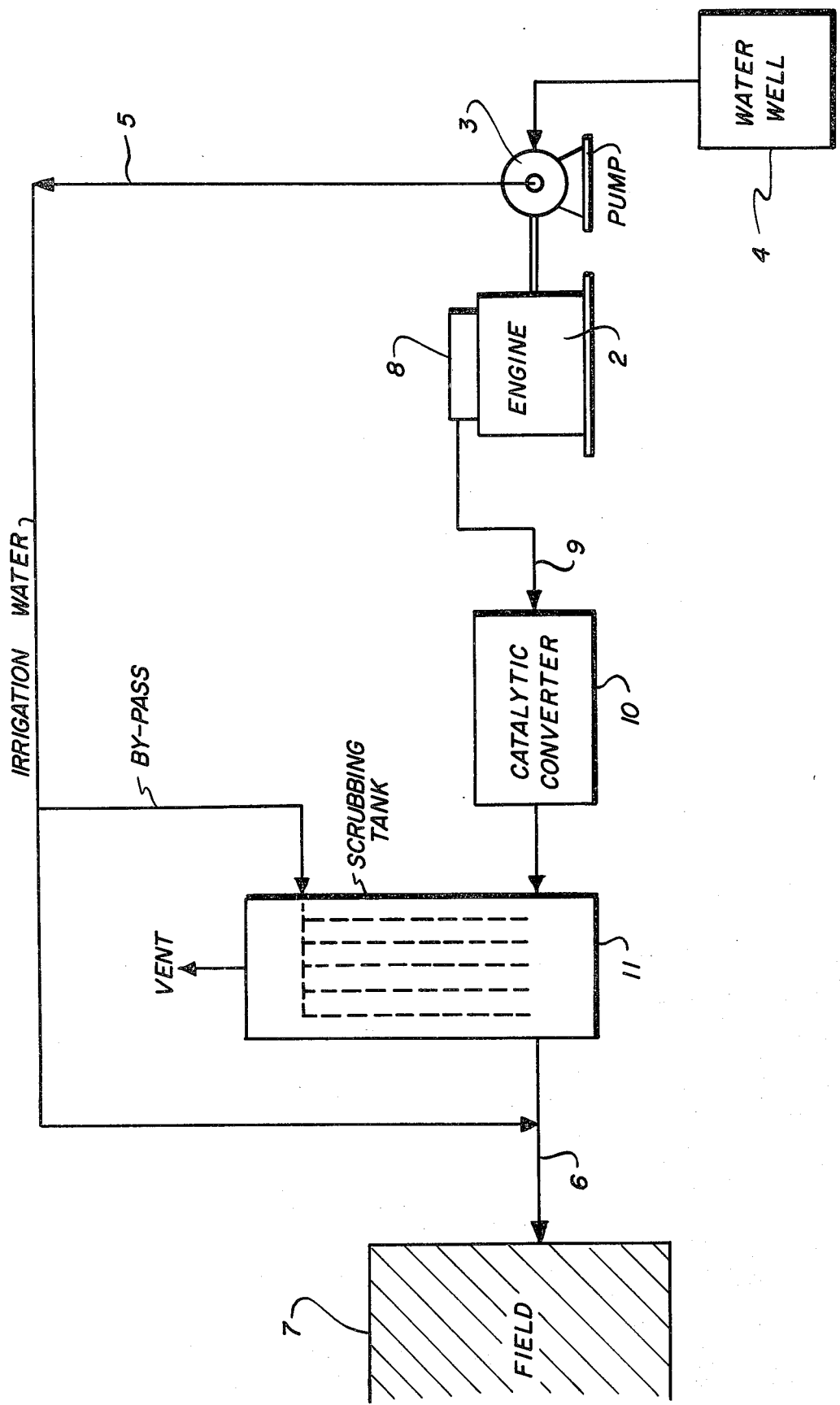

IRRIGATION ENGINE EXHAUST CONVERSION TO OBTAIN FERTILIZING SOLUTION

This invention relates to a method of improved fertilization of crop areas by utilizing ammonia formed from the onsite conversion of nitric oxide emissions in exhaust of conventional engines used in driving irrigation pumps, thereby also reducing air pollution. The invention also relates to a combination of ammonia-catalytic conversion means and such irrigation engines.

The irrigation wells and pumping facilities have come to be an accepted part of general crop planting. In areas where rainfall is limited to a level below that required by the crops, water has to be supplemented from other sources. Typically, water is supplied from distant sources by irrigation canals or brought up from underground springs. Thus in arid regions such as the southwest and mid-central states, there are numerous water wells and pumping stations. In any event, such supplemental bodies of water are a recognized part of the grower's armamentarium where rainfall is characteristically limited or erratic with respect to predictability.

At each water well, the underground water is brought up by pumping. These irrigation pumps are commonly driven by engines. Some of these engines are designed specifically for driving pumps but many are converted from automobile engines. Some of them are fueled with gasoline whereas others may be fueled with diesel fuel, propane or natural gas. In all cases, these irrigation engines are sources of air pollution as many known pollutants such as nitric oxide, hydrocarbons and carbon monoxide are produced in appreciable amount from the engine exahust.

The need for reducing exhaust emission of automobile engines has been well recognized; stringent control practices are being applied to all vehicular engines produced today. Similar practices will also be applied to engines in stationary applications such as the irrigation engines referred to in this invention.

The installation of an exhaust emission device, such as a catalytic converter, represents added cost to the engine user. To encourage the use of such devices, it is highly desirable if the engine user will be reimbursed with the total, or a portion of the cost of the devices. Compensation of such cost may occur by converting the engine exhaust pollutants to a useful chemical.

In crop planting, not only large bodies of water are used for irrigation but it is recognized that water soluble chemicals can be added for purposes of dispensing nutrients or pesticides to the soil. Nitrogen fertilizers, such as aqueous ammonia solution, are typically applied in the field by spraying or the like. The importance of chemical fertilizers, typically ammonia, has been well recognized in crop planting.

It is one object of the present invention to utilize conventional irrigation engines in an improved manner so that fertilization of the crops takes place, as well as irrigation.

It is yet another object of the present invention to provide a method by which otherwise noxious emissions of internal combustion engine exhausts in irrigation engines are utilized to obtain favorable ammonia fertilizer while the combustion engine is running, and further dispensing such fertilizer as an aqueous solution by utilizing the body of water otherwise earmarked for irrigation alone.

It is still another object of the present invention to provide a method whereby nitric oxide from irrigation engine exhausts is catalytically converted to ammonia by efficiently utilizing engine temperatures, recognized catalysts, and presence of different exhaust engine constituents.

It is yet still another object of the present invention to provide an improved irrigation pump-engine assembly including means for condensing water vapor produced by engine combustion that will be otherwise lost to the atmosphere, and utilizing the condensed water for irrigation.

The foregoing objects are now attained together with still other objects which will occur to practitioners from considering the invention detailed in the following disclosure. Such disclosure includes FIG. 1 which shows a schematic representation of an improved irrigation assembly for practicing the method of the invention.

The schematic drawing illustrates in general fashion an irrigation internal combustion engine 2, which operates pump 3 to deliver water from source or well 4 along line 5 where it is delivered from discharge line 6 to the field or crop area 7.

Exhaust from engine manifold 8 is delivered along exhaust line 9 to a catalytic conversion zone 10 where under conditions of exhaust temperature the nitrogen oxide pollutants are treated to obtain ammonia therefrom. The catalytic conversion zone 10 may simply be an enclose chamber to which exhaust gases are routed, such chamber containing a catalyst bed which is made of selected catalyst. The formed ammonia may be contacted with the body of irrigation water in the irrigation engine directly by gas-liquid contact at the discharge line 6, or a portion of such body of irrigation water may be routed to a scrubbing zone or tank 11 for more efficiently dissolving the ammonia, whereupon such scrubbing zone water may be returned to the irrigation water or dispensed directly onto the crop area.

The scrubbing tank may have a design similar to convential water-cooling towers providing only that the back pressure be insufficient to affect the exhaust systems. In a common embodiment, the internal combustion engine of the irrigation vehicle pumps the body of irrigation water for discharge to the crop area. A portion of such pump water can be bypassed to a scrubbing tank to which the exhaust stream is directed.

The art of catalytic conversion of nitrogen oxides is well known, and such term is intended to collectively represent the nitrogen and oxygen bound pollutants commonly found in exhaust streams of internal combustion engines. For the most part, the symbol $NO_x$ represents nitric oxide but may also refer to nitrogen dioxide. It is recognized in the art that nitrogen oxide gases are converted to ammonia in various catalytic reactions, such catalysts being well recognized in the art for such conversion. Among the known catalysts are the precious metals such as platinum, palladium, rhodium, rhenium, and the like. These are generally in the form of supported catalysts, that is placed on carriers, such as alumina or the like. Base metals have been used as catalysts, particularly oxides of copper, iron, nickel, chromium, aluminum, vanadium, and the like. Unsupported metallic alloys such as oxidized stainless steel and copper-nickel alloy may also be used.

The practitioner will readily determine which catalyst or catalyst system to employ after considering factors such as the exhaust gas temperature, the concentration of nitric oxide in the exhaust gas and the presence of carbon monoxide and/or oxygen. It has been found, for example, that a base metal such as copper chromite operates efficiently at exhaust gas temperatures of about 400°C. A minor proportion of copper chromite is carried on a major proportion of the carrier such as alumina extrudate. As a further example, a copper oxide catalyst was found to be active at about 300°C. Metallic alloy catalysts are more effective at temperatures about 500°C. A minor proportion of copper oxide on a major proportion of carrier can be more effectively active at a temperature range of about 300°C to about 400°C. Base metals such as copper chromite are generally more effective in temperature ranges of about 400°C to about 500°C.

It is recognized that the presence of carbon monoxide in the exhaust gas stream improves the formation of ammonia by catalytic conversion of nitric oxide. A base metal oxide such as iron oxide is found desirably active at exhaust stream temperatures of about 500°C in the presence of carbon monoxide and high inlet nitric oxide concentrations. In general, the presence of oxygen in the exhaust tends to shift the peak ammonia formation by catalyticc conversion with base metals to higher temperature ranges.

Further understanding of the invention is obtained by considering the following illustrative teaching. The catalytic conversion of nitric oxide in the exhaust stream generally results in the formation of ammonia, nitrogen gas and water vapor. Utilizing a base metal catalyst such as copper oxide-vanadia, generally one mole of nitric oxide can be converted to at least one half mole of ammonia, actually about 0.7 moles of ammonia. An internal combustion engine at an irrigation pumping station which produces an average nitric oxide emission of 4 lbs. per million Btu can generate about 1.4 lbs. of ammonia per million Btu of fuel consumed. A typical 150 horsepower engine services about 150 acres by pumping about 1.5 acre-ft. of water per season of about 120 days in a Texas Panhandle area. Based upon a specific fuel consumption factor of 8,000 Btu/hp/hr, about 4,900 lbs. of ammonia can be produced per year. This amount of ammonia dispensed as aqueous solution can provide about 10% of the nitrogen fertilizing requirements of a crop of corn from the foregoing acreage.

As further illustrative teaching, efficient conversion of nitric oxide to ammonia occurs with a catalyst system comprising 6% copper and 6% chromite supported on about 88% alumina extrudates, at an exhaust temperature of 400°C. As a further teaching, 10% of copper oxide supported on 95% alumina dioxide and 5% silicone dioxide actively converts nitric oxide at an exhaust stream temperature of 300°C. In yet other representative teachings, a catalyst system comprising 10% iron supported on 95% alumina trioxide and 5% silicone dioxide actively converts nitric oxide at an exhaust stream temperature of 500°C in the presence of carbon monoxide in the exhaust stream.

Further yet understanding of the invention is obtained by considering the following illustrative teaching. The major product of fuel combustion in engines is water vapor. A typical 150 horsepower engine fueled with natural gas and operated continuously for 120 days produced about 338,000 lbs. of water which, in conventional practice, are lost to the atmosphere as water vapor. In this invention, however, the water vapor is condensed when the exhaust gas is delivered to the scrubbing tank. The condensed water vapor is added to the irrigation water and utilized by the crop, or may be directly discharged onto the crop area.

The invention described herein leads to numerous advantages, including economical. It is estimated that the cost of providing an irrigation engine with a catalytic conversion unit can be recovered in several seasons use considering current costs of ammonia, and the savings from forming such ammonia in place by the running internal combustion engine. Among other advantages are the important reductions of the nitric oxide pollutants for discharge into the atmosphere. This recognized notorious problem has in fact been countered by some States requiring limits on nitrogen oxide emissions. Thus, not only are nitrogen oxide emissions reduced, but concurrently valuable fertilizing products are obtained following conversion of the noxious products. The method and system disclosed herein requires that the ammonia be formed by catalytic conversion of gaseous nitric oxide prior to dissolving the ammonia in the body of the irrigation water. Nitric oxide is only slightly soluble in water, thereby requiring this preliminary conversion.

The claims of the invention are now presented, and the terms in such claims may be further understood by reference to the language of the foregoing disclosure.

We claim:

1. A method of fertilizing by converting exhausts from irrigation pump engines to obtain aqueous ammonia solutions, which includes the steps of:

delivering exhaust from the irrigation pump engine to a catalytic conversion zone, said catalytic conversion zone containing catalysts for treating nitric oxide emissions to directly obtain ammonia in place under exhaust temperature conditions, delivering a portion of a body of water pumped by the irrigation engine to a scrubbing chamber, intimately contacting the formed gaseous ammonia with the water in said scrubbing chamber to form an aqueous ammonia solution, returning said aqueous ammonia solution to the body of water, and discharging said aqueous ammonia solution to fertilize a crop area.

2. A method which includes the steps of claim 1 above, wherein the catalyst is a metallic alloy when exhaust engine temperatures are above about 500°C.

3. A method which includes the steps of claim 1 above wherein said catalyst is a supported base metal oxide when the vehicle exhaust temperature is up to about 400°C.

4. A method which includes the steps of claim 1 above, wherein the catalyst is iron oxide supported on alumina, the exhaust temperature is at least 500°C, and said exhaust contains carbon monoxide emissions.

5. A method which includes the steps of claim 1 above, wherein the catalyst is a base metal, the exhaust contains oxygen, and the exhaust temperature is at least 500°C.

6. A method which includes the steps of claim 1 above which further includes delivering the exhaust to a scrubbing chamber to condense the water vapor therein, and adding said water condensate to the body of water pumped by said vehicle engine.

7. In an irrigation pump, an internal combustion engine and an associated body of irrigation water for dispersing onto a crop area, the improvement which comprises a catalytic conversion unit positioned to receive exhaust gas stream from the internal combustion engine, said unit having a catalytic system to convert nitrogen oxide pollutant emissions directly to ammonia in place under exhaust temperature conditions, and means to deliver the formed gaseous ammonia to at least a portion of the body of irrigation water to obtain an aqueous ammonia solution to be dispensed onto the crop area.

8. A combination of features as in claim 7 above which further includes by-pass means to deliver a portion of the body of irrigation water to a scrubbing chamber, wherein the water intimately contacts the gaseous ammonia at water pressure levels insufficient to increase the back pressure of the exhaust system.

* * * * *